Patented Jan. 13, 1925.

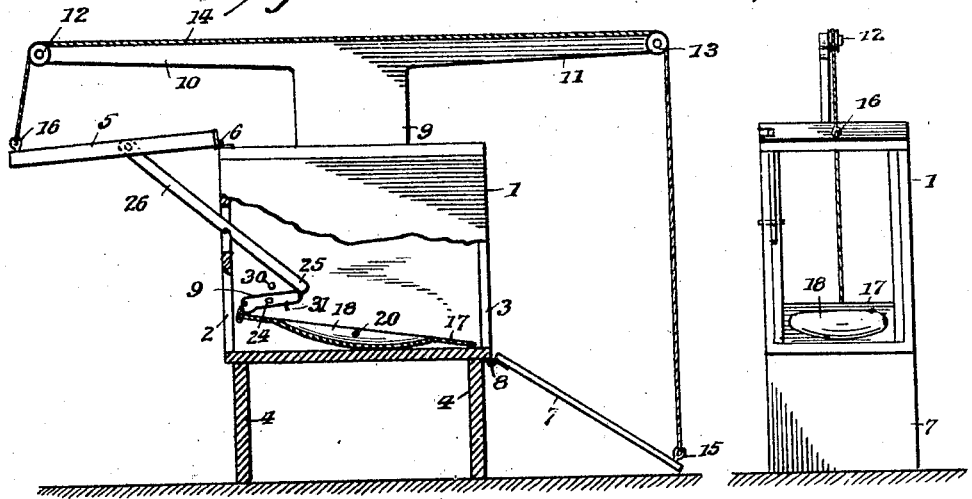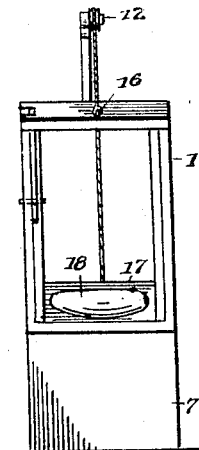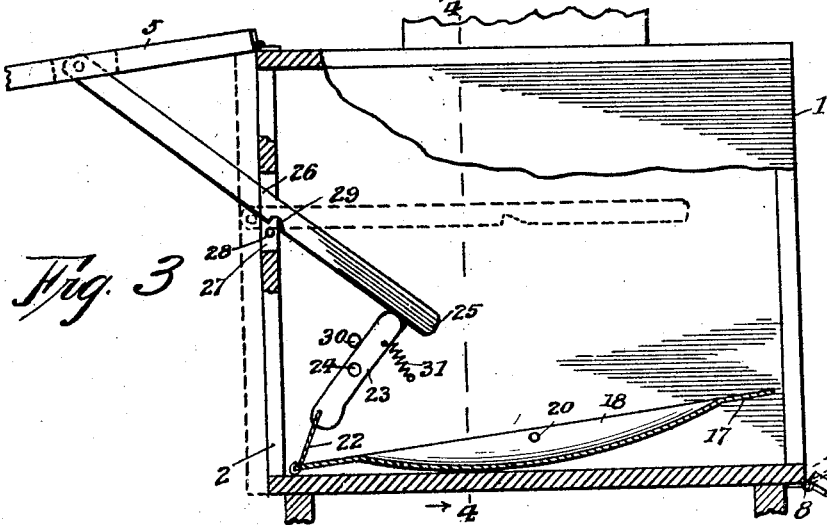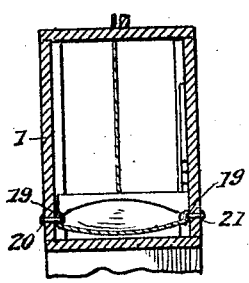

1,523,256

UNITED STATES PATENT OFFICE.

EDGAR BUTLER, OF TOPEKA, KANSAS.

AUTOMATIC TRAP NEST.

Application filed June 20, 1924. Serial No. 721,269.

*To all whom it may concern:*

Be it known that EDGAR BUTLER, a citizen of the United States, residing at Topeka, in the county of Shawnee and State of Kansas, has invented certain new and useful Improvements in Automatic Trap Nests, of which the following is a specification.

This invention relates to an automatic trap nest and has for its principal object to provide a novel means whereby when a hen enters the nest, a door will be closed behind the hen, means being provided whereby when the hen leaves the nest a door will be opened and at the same time reset the nest to an operative position.

Another important object of the invention is to provide an automatic trap nest of the above mentioned character, which is of such a construction as to enable the same to be automatically set in an operative position by the entrance and exit of a hen therein.

A still further object of the invention is to provide an automatic trap nest of the above mentioned character, which is simple in construction, inexpensive, strong, durable and well adapted for the purposes for which it is designated.

Other objects and advantages of this invention will become apparent during the course of the following description.

In the accompanying drawings forming a part of this specification and in which like numerals designate like parts throughout the same:—

Figure 1 is a side elevation of my trap nest with parts shown in section and the same being in the position ready to receive the hen.

Figure 2 is an end elevation showing the entrance of the trap nest.

Figure 3 is an enlarged sectional view showing the trap nest in section with some of the elements shown in side elevation, and Figure 4 is a sectional view taken on line 4—4 of Fig. 3.

In the drawings wherein for the purpose of illustration is shown the preferred embodiment of my invention, the numeral 1 designates a casing which is of a boxlike construction and is provided with an opening 2 in one end thereof which provides the inlet or entrance to the nest, the opposite end being also open as shown as 3 in the drawings to provide for an outlet. The casing 1 is supported by the supporting member 4 in the manner as more clearly shown in Fig. 1 of the drawings.

The inlet end 2 is provided with a cover 5 which is hinged at 6 to the upper end of the casing 1 and the outlet end 3 of the casing 1 is provided with the hinged cover 7 which is hinged to the bottom end of the casing 1 as shown at 8 in the drawings. A suitable cross head 9 is supported upon the top of the casing 1 and the arms 10 and 11 of the cross head 9 are adapted to support the pulleys 12 and 13 respectively and these arms 10 and 11 extend outwardly from the cross head 9 for a substantial distance. Adapted to be mounted over the pulleys 12 and 13 of the cross head 9 is the cable 14 which is connected at one end to the free end of the hinged cover 7 as shown at 15 in the drawings and the opposite end of the cable 14 is connected to the free end of the cover 5 as shown at 16 in the drawings. In this manner it will be seen that the hinged covers 5 and 7 respectively will be caused to simultaneously be operated by the device hereinafter to be more fully described.

Pivotally mounted within the casing 1 and adjacent the bottom thereof is the platform 17 which is provided with a central depressed portion 18 which forms the nest proper for receiving the hen. The platform 17 has the nest portion 18 thereof provided with suitable apertures 19 in the sides thereof so as to receive the supporting pins 20 and 21 which extend through the sides of the casing 1 whereby the platform and nest may be pivotally supported in the casing.

The platform 17 has its forward end adjacent the inlet opening 2 and is secured to a flexible member 22 which is connected at its opposite end to the lower end of a trip lever 23. This trip lever 23 is pivoted at 24 in one side of the casing 1 and the upper free ends thereof are adapted to engage the lower end 25 of an elongated rod 26 which is pivotally connected at its opposite end to the hinged cover 5 and this elongated rod 26 extends through a suitable opening 27 provided in the inlet end adjacent directly above the inlet opening 2. A suitable pin 28 is provided in the opening 27 and is adapted to fit in the notch 29 formed in the bottom face of the elongated rod 26 intermediate its ends. The purpose of this construction will be hereinafter more fully described. A suitable stop pin 30 is supported in one side of the casing 1 and is adapted to limit the movement of the trip lever 23 in one direction. A coil spring 31 is connected to the casing at one end and to the trip lever 23 adjacent the free end 24 thereof for a purpose to be more fully described.

Normally the trap nest is in the position as shown in Fig. 1 of the drawings wherein the hinged cover 5 is extended in a horizontal position and the notch 29 in the elongated rod 26 rests on the pin 28 provided in the inlet end of the casing 1. When in this position the free end of the elongated rod 26 is in engagement with the free end of the strip lever 23 as more clearly shown in Fig. 1 of the drawings. It is to be also noted that the hinged cover 7 is free from the outlet 3 provided in the casing 1. The trap nest being set in this position, the hen enters through the inlet opening 2 and upon stepping upon the platform 17, the trip lever 23 is caused to swing upon the pivotal support therefor and thereby causes the free end to raise the free end 25 of the elongated bar upwardly whereby the notch 29 in the elongated bar 26 is released from engagement with the pin 28 so as to permit the hinged cover 5 to move downwardly. It is to be further understood that the hinged cover 5 is of greater weight than the hinged cover 7 thereby permitting the hinged cover 5 to swing downwardly by gravitation and cause the bar 26 to move inwardly within the casing 1 and at the same time cause the door 5 to close the inlet opening 2 and set the outlet cover or door 7 into a raised position as shown in the dotted lines in Fig. 3 of the drawings. The hen seated within the nest 18 is prevented from leaving the casing 1 through the inlet opening and must leave through the outlet opening 3. When the hen leaves the nest 18 and the casing 1 it passes through the outlet 3 and steps upon the hinged cover 7. Upon stepping upon the hinged cover 7 the cable 14 will be caused to be brought downwardly and at the same time cause the hinged cover 5 of the inlet opening 2 to be raised and upon raising the cover 5 the elongated bar 26 is again brought into its normal position whereby the free end 25 thereof is in engagement with the free end 24 of the trip member 23 it being further understood that the spring 31 will normally retain the trip lever in a horizontal position as shown in Fig. 1 of the drawings after the hen has left the nest 18. When in this position it will be seen that the hen upon leaving the casing will reset the nest so as to permit another hen to enter the same.

It will thus be seen from the foregoing description that an automatic trap nest has been provided wherein the nest is set automatically by the entrance and exit of a hen and does not require the necessity of a person standing nearby to set the nest after the hen has left the same.

The simplicity of the arrangement of my trap nest renders the same very efficient in use and does not require the necessity of a number of complicated parts in order to accomplish the necessary results.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion and in the minor details of construction may be resorted to, without departing from the spirit or sacrificing any of the principles of the invention.

What I claim as new and desire to secure by Letters Patent is:—

1. An automatic trap nest of the class described comprising a casing provided with an inlet at one end and an outlet in the opposite end, hinged closures therefor, a cross head mounted on the top of said casing and having the arms of said cross head provided with pulleys at the outer ends thereof, a cable connected at its outer ends to said closures and adapted to travel over said pulleys on said cross head, a nest pivotally mounted in said casing, a trip lever associated with said nest adjacent the inlet opening and adapted to release the closures therefor, said closures operating simultaneously as and for the purpose described.

2. An automatic trap nest of the class described comprising a casing provided with an inlet in one end and an outlet in the opposite end, hinged closures therefor, a trap nest pivotally mounted in said casing adjacent the bottom thereof, a trip lever pivotally mounted in said casing and connected to one end of said nest adjacent the inlet of said casing, an elongated bar pivotally mounted at one end to the inlet closure for said inlet, the opposite end of said bar extending through the inlet end of said casing and having the free end thereof in engagement with said trip lever, means connecting said closures whereby the same are operated simultaneously by the action of the trip lever on said bar.

3. An automatic trap nest of the class described comprising a casing having an inlet at one end and an outlet at the opposite end, closures therefor, a cross head mounted on the top of said casing and having the outer ends of the arms thereof provided with pulleys, a cable connected at its respective ends to said closures and traveling over said pulleys on said cross head, a nest pivotally mounted in said casing adjacent the bottom thereof, a trip lever pivotally mounted in said casing adjacent the inlet therein, a flexible connection between said nest and the lower end of said trip lever, an elongated bar pivoted to said closure for said inlet and having the free end thereof extending through an opening provided in the inlet end of said casing, the free end of said bar being in engagement with the free end of said trip lever, said bar normally supporting said closure in an inoperative position, and said trip lever adapted to move said bar whereby said closures are simultaneously operated.

4. An automatic trap nest of the class described comprising a casing provided with an inlet in one end and an outlet in the opposite end, hinged closures therefor, a cross head on the back of said casing and having the arms thereof provided with pulleys at the outer end, a cable having its ends connected to said closures and extending over said pulleys on said cross head, a nest pivotally mounted intermediate its end in said casing adjacent the bottom thereof, a trip lever pivotally mounted in said casing adjacent the inlet end, a flexible connection between the lower end of said trip lever and said nest, means for normally retaining said trip lever in an approximately horizontal position, an elongated bar pivoted to the closure for said inlet and extending through an opening in the inlet end of said casing, a pin extending in said opening and adapted to engage the notch provided in said elongated bar to normally support the closure in an inoperative position, the free end of said bar being in engagement with the upper free end of said trip lever, said trip lever adapted to release said bar from said pin whereby said closures may be actuated simultaneously, as and for the purposes described.

In testimony whereof I affix my signature.

EDGAR BUTLER.